UNITED STATES PATENT OFFICE.

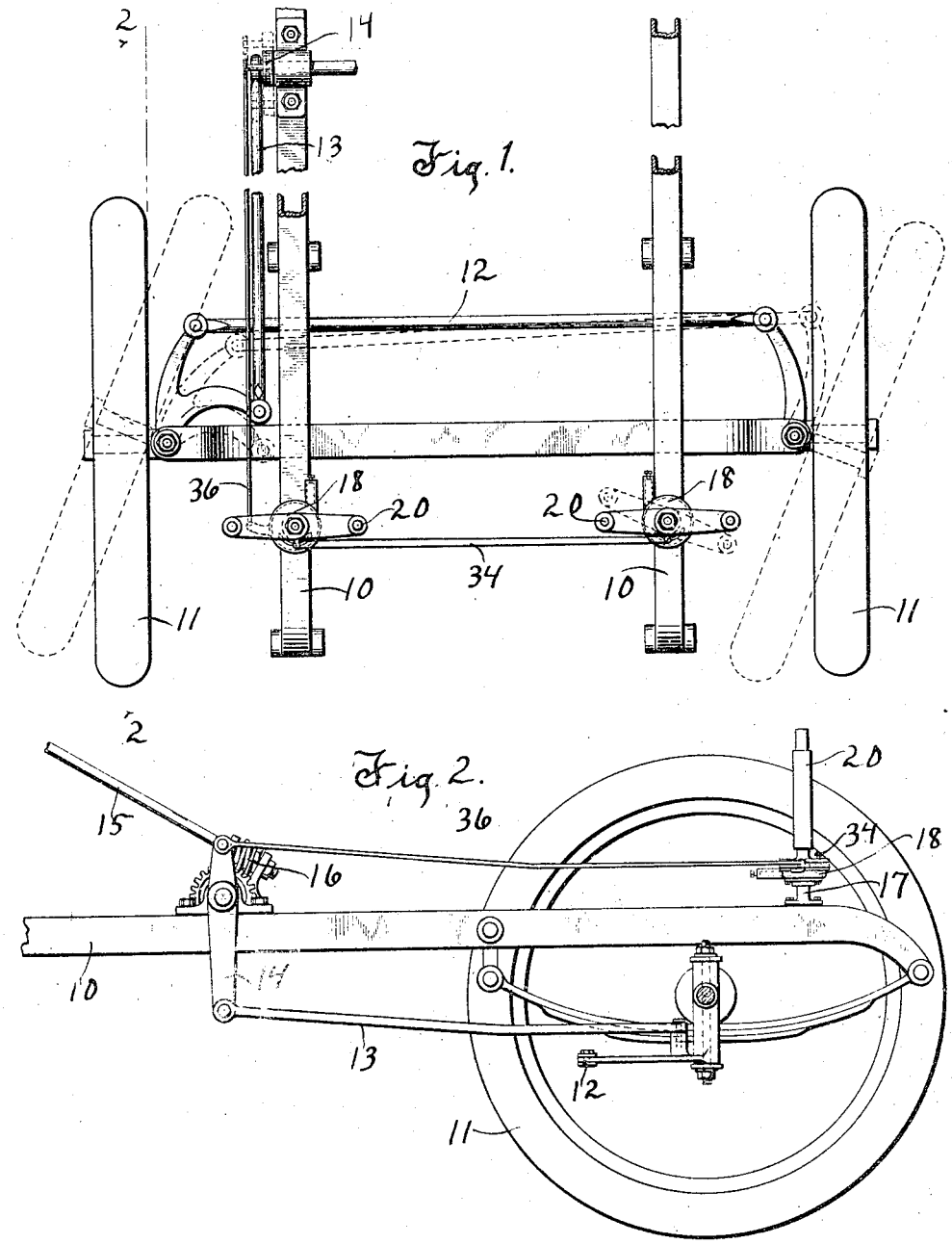

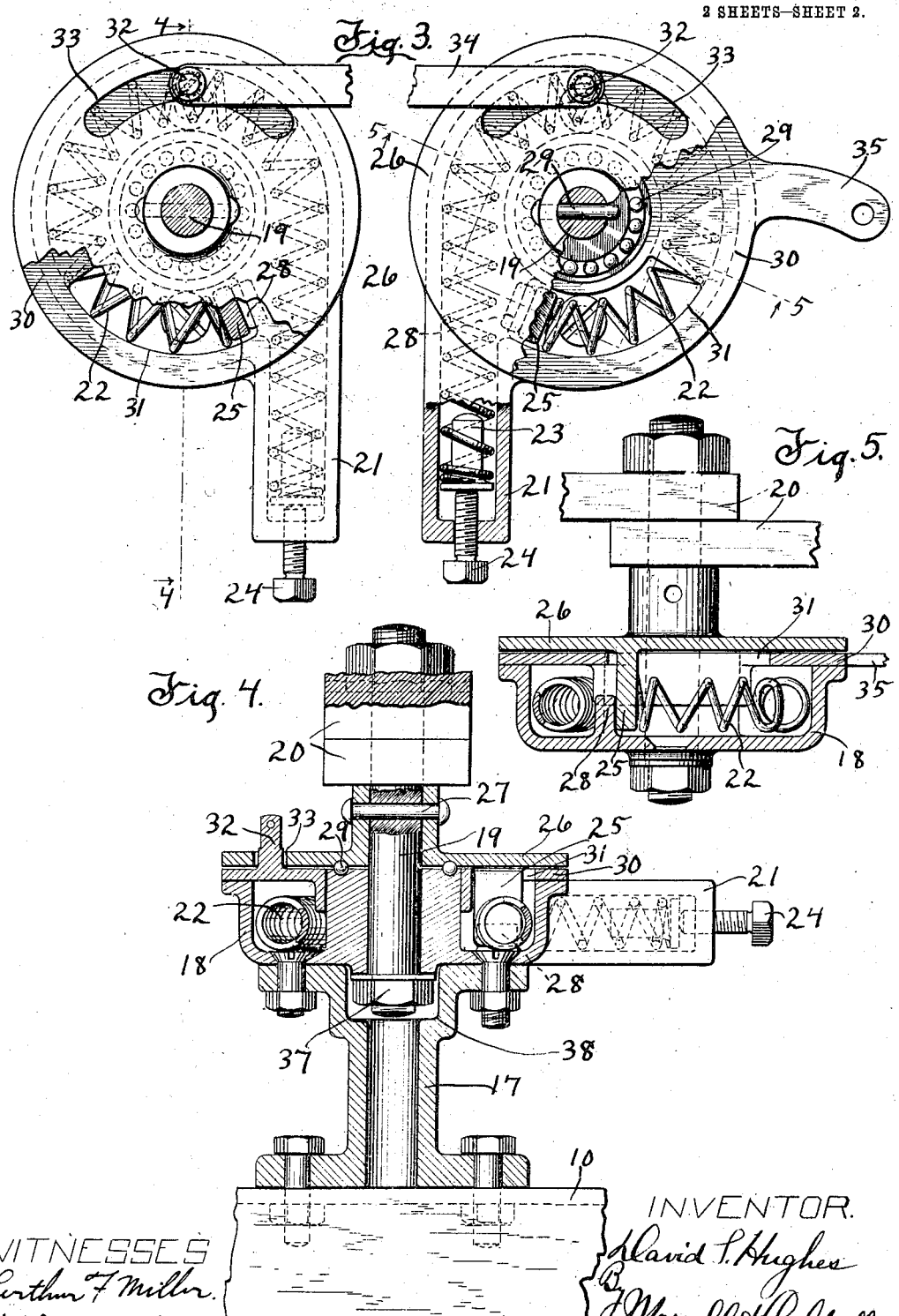

DAVID SAMUEL HUGHES, OF RACINE, WISCONSIN, ASSIGNOR OF ONE-THIRD TO WILLIAM C. DAVIS AND ONE-THIRD TO REUBEN E. ROBERTS, BOTH OF RACINE, WISCONSIN.

AUTOMOBILE LAMP MECHANISM.

1,069,615.  Specification of Letters Patent.  Patented Aug. 5, 1913.

Application filed November 21, 1912. Serial No. 732,672.

*To all whom it may concern:*

Be it known that I, DAVID S. HUGHES, a citizen of the United States, and resident of Racine, in the county of Racine and State of Wisconsin, have invented new and useful Improvements in Automobile Lamp Mechanisms, of which the following is a description, reference being had to the accompanying drawings, which are a part of this specification.

This invention relates to lamps for automobiles and the like and has for its object to provide for directing the rays from the lamp at an angle to the vehicle when the front wheels are turned so that the light will be thrown in the direction in which the vehicle is to be turned.

Another object of the invention is to provide an automobile with a pair of lamps, one of which is adapted to turn when the front wheels of the vehicle are turned in one direction, and the other of which is adapted to turn when the vehicle wheels are turned in the other direction, one lamp remaining in the same direction as the vehicle in either case.

With the above and other objects in view the invention consists in the automobile lamp mechanism as herein claimed and all equivalents.

Referring to the accompanying drawings in which like characters of reference indicate the same parts in the different views: Figure 1 is a plan view of the front portion of an automobile frame, showing the lamp mechanism of this invention applied thereto, the position of the parts when turning the vehicle being shown in dotted lines; Fig. 2 is a side view thereof with one of the front wheels of the vehicle removed on the plane of line 2—2 of Fig. 1; Fig. 3 is a detail plan view of both bracket supports, parts being broken away for clearness of illustration; Fig. 4 is a sectional elevation of one of the lamp bracket supports on the plane of line 4—4 of Fig. 3; and, Fig. 5 is a sectional view of one of the lamp bracket supports on the plane of line 5—5 of Fig. 3.

In these drawings 10 indicates an automobile frame of ordinary construction provided with pivotally mounted front wheels 11 as usual which have their knuckle joints connected by the connecting link 12 to cause them to move in unison and which are operated by the connecting bar 13 from the crank arm 14 which is turned by the steering post 15 through its worm connection 16 therewith. On each of the side members of the frame, near the front end thereof, is mounted a lamp bracket but instead of said lamp bracket being rigid as usual it is mounted to turn so as to direct the rays of the lamp supported thereby at an angle to the automobile under certain conditions. As best seen in Fig. 4 the support of the lamp bracket comprises a base or standard 17 which may be bolted or otherwise clamped to the frame of the vehicle and which has bolted to it a casing 18 forming the bearing for the pivotal stem 19 of the lamp bracket 20. The casing 18 has formed within it an annular chamber and has a rearwardly extending hollow projection 21 forming a tangential continuation for the annular chamber in which is confined a coil spring 22. Plug 23 fits within the end of coil spring 22 which is contained within the extension 21 and a set screw 24 threaded in the end of said extension bears against the plug 23 to vary the degree of compression of the spring. The other end of spring 22 bears against a downwardly extending lug 25 of a cover plate 26 which is fixed on the pivotal stem 19 of the lamp bracket by having a pin 27 passing through them, as shown in Fig. 4. The lug 25 against which the spring bears, as seen in Fig. 5, is normally held by the pressure of the spring in engagement with an upstanding stop lug 28 in the spring chamber of the casing. The cover plate 26 being fixed on the lamp bracket and being normally held in a definite position by the pressure of the spring, the lamp bracket is thus maintained in its normal position in which the lamp is directed straight forward and its deflection from such position is only permitted in one direction and then by the compression of the spring 22 so that when the deflecting force ceases to act the spring will restore the lamp bracket to its normal position. In order to facilitate the pivotal movements of the lamp bracket a ball bearing is formed by ball 29 in a raceway between the top plate 26 and the central portion of the casing 18, there being a nut 37 threaded on the lower end of stem 19 for holding the lamp bracket in its bearing and the standard 17 being recessed at 38 to receive such nut. A disk 30 is rotatably mounted on the central hub-like portion of casing 18 and its outer edge lies between the upper edge of the casing and the edge of the top plate 26, there being a curved slot 31 in said disk through which the lug 25 passes, as clearly shown in Fig. 5.

A stud 32 projects upwardly from the disk 30 and travels in an arc-shaped slot 33 of the top plate 26 and a link 34 connects the studs 32 of the two lamp bracket supports, as best seen in Fig. 1, so that the disk members of both supporting devices will move in unison. The casings 18 of the two supporting devices, however, are oppositely disposed, that is to say the compression of the spring in one by means of the movements of the lamp bracket is performed by a clockwise direction of movement of the lug 25 engaging the spring and in the other by an anti-clockwise movement of the lug. One of the disks 30 is provided with an outwardly extending arm 35 which is connected by a link 36 with the upper end of the crank arm 14 so that the movement of the crank arm incident to the turning of the front wheels of the vehicle causes a turning movement of the disks 30 of both lamp bracket supports. The lug 25 in one bracket support is normally a short distance from the right end of the slot 31 in the disk 30 of that support while the lug 25 of the other support is normally located a short distance from the left end of the corresponding slot 31 and when the disks are turned in one direction by the action of the steering post in shifting the front wheels of the vehicle for making a turn one of the lugs 25 will be engaged by the end of the slot 31 and will be caused thereby to move against the pressure of its spring 22 and thus cause the lamp bracket to turn on its swivel mounting while the other lamp bracket remains stationary. The movement of the disk 30 of the support for the lamp bracket which remains stationary is permitted by the slot 31 thereof moving its distant end toward the lug 25 and the length of this slot is sufficient to permit of the extreme angle of movement desired for the lamp bracket.

In operation the turning movement of the steering post 15 which swings the crank arm 14 for turning the front wheels of the vehicle also serves to swing one lamp from its normal straight-ahead position to an angular position substantially corresponding with the angular position to which the front wheels of the vehicle are moved, as shown in dotted lines in Fig. 1, and the preferred arrangement is such that when the adjustment is made for swinging the front wheels of the vehicle to make a turn to the right the lamp on the right remains in its straight-ahead position while the lamp on the left turns to the right and when the front wheels of the vehicle are swung to make a turn to the left the left lamp remains in its straight-ahead position while the right lamp is turned to the left. The adjusting set screws 24 enable the springs to be adjusted to the desired degree of compression, so that the lamp brackets are promptly returned to their straight-ahead position as soon as the front wheels of the vehicle are swung back to their normal position. The normal positions of the disks 30 being such that their slots 31 have their near ends spaced from the lugs, there is a certain amount of play in their turning movements in either direction from the normal position before the lamp brackets are affected. This allows for the slight changes in direction incident with avoiding obstructions or choosing the course during straight-ahead travel without changing the position of the lamps, but when a turn is to be made and it is desirable to throw the light in the direction of the turn as well as straight ahead the lamps assume positions accordingly.

What I claim as new and desire to secure by Letters Patent is:

1. An automobile lamp mechanism, comprising a spring casing forming an annular spring chamber with a tangential extension, a coil spring contained within the spring chamber, a set screw in the extension of the spring chamber for adjusting the compression of the spring, a slotted disk pivotally mounted on the casing, a lamp bracket having a stem journaled within the casing, a top plate carried by the stem of the lamp bracket, a lug on the top plate passing through the slot of the disk and engaged by the end of the spring, a stop in the casing against which the lug is normally held by the spring, and means for connecting the disk with the steering mechanism.

2. An automobile lamp mechanism, comprising a pair of standards adapted for connection with the frame of an automobile, a casing secured to each of the standards and provided with an annular spring chamber with a tangential extension, a coil spring contained within the spring chamber, a set screw threaded in the extension and bearing against the end of the spring for adjusting the compression of the spring, a disk pivotally mounted on each of the casings and provided with an arc-shaped slot and an outwardly projecting stud, a pair of lamp brackets, each having a stem journaled within one of the casings, a top plate on the stem of each lamp bracket provided with an arc-shaped slot through which the stud projects and provided with a lug passing through the slot of the disk and engaged by the end of the spring, a stop in the casing engaged by the lug, a link connecting the studs of the two disks, an arm on one of the disks, and a link for connecting the arm with the crank arm of the steering mechanism.

In testimony whereof, I affix my signature, in presence of two witnesses.

DAVID SAMUEL HUGHES.

Witnesses:
WILLIAM W. STORMS,
D. C. METCALF.

Copies of this patent may be obtained for five cents each, by addressing the "Commissioner of Patents, Washington, D. C."